United States Patent [19]

Murphy

[11] Patent Number: 4,505,349
[45] Date of Patent: Mar. 19, 1985

[54] STEERING MEANS FOR, AND IN COMBINATION WITH, AN ARTICULATED VEHICLE

[75] Inventor: Bernard J. Murphy, Mountain Lakes, N.J.

[73] Assignee: Ingersoll-Rand Company, Woodcliff Lake, N.J.

[21] Appl. No.: 500,575

[22] Filed: Jun. 2, 1983

[51] Int. Cl.³ .................... B62D 5/10; E01C 19/26
[52] U.S. Cl. .................................. 180/136; 172/170; 180/20; 180/140; 280/468; 404/126
[58] Field of Search ............... 180/134, 140, 136, 20; 280/468, 400, 462, 463; 172/799, 781, 170; 404/126

[56] References Cited

U.S. PATENT DOCUMENTS

| | | | |
|---|---|---|---|
| 3,947,142 | 3/1976 | Takata et al. | 404/126 |
| 4,033,427 | 7/1977 | Sturesson | 180/140 |
| 4,471,850 | 9/1984 | Rotz | 180/136 |

FOREIGN PATENT DOCUMENTS 2520776  8/1983  France ....................... 404/126

Primary Examiner—Joseph F. Peters, Jr.
Assistant Examiner—Mitchell J. Hill
Attorney, Agent, or Firm—B. J. Murphy

[57] ABSTRACT

In the embodiment disclosed, the invention comprises a single, dual-piston cylinder, operable by hydraulic fluid, interpositioned between a pair of pivotably coupled, vehicular units. The cylinder is pivotably secured to pivot coupling elements which join the units, and each piston has its translating rod pivotably coupled to one of the units. Ports opening into the cylinder admit and discharge operating, pressured, hydraulic fluid (a) to displace the pistons apart, whereby a first crab steering is effected, (b) to move the pistons into mutual proximity, whereby a second, alternate crab steering is affected, (c) to displace the pistons in unison, in a first direction, whereby a left-hand or right-hand steering is effected, or (d) to displace the pistons in unison, in an opposite direction, whereby the opposite-handed steering is effected.

11 Claims, 3 Drawing Figures

STEERING MEANS FOR, AND IN COMBINATION WITH, AN ARTICULATED VEHICLE

This invention pertains to steering apparatus and mechanisms for, and in combination with, articulated vehicles, and in particular to steering means for, and in combination with, articulated vehicles, which effects left-hand and right-hand steering of the vehicle, as well as left-crab and right-crab attitudes thereof.

U.S. Pat. No. 4,033,427, issued July 2, 1977, to Rune Sturesson, for "Steering Apparatus for Road Rollers" has a very simple steering arrangement. An actuating cylinder is pivotably coupled at the middle of the machine, an articulated vehicle, and a single piston (not shown) translates a single piston rod to steer the compactor, a dual-drum unit, to the left or to the right. One end of the piston rod is coupled to the right-hand side of the frame of a leading drum, and the other end is coupled to the left-hand side of the frame of the trailing drum.

This is neat, simple and straightforward, but this arrangement will not accommodate crab steering.

Some prior art discloses steering means for articulated compactors and the like, which have left, right and crab steering, but they require a plurality of hydraulic actuating cyclinders. Exemplary thereof is U.S. Pat. No. 3,947,142, issued Mar. 30, 1976, to Harry H. Takata et al., for an "Articulated Pavement Compacting Machine.

Dana R. Rotz, disclosed an improved arrangement for universal articulation (left, right, and crab steering), in his co-pending U.S. Pat. No. 4,471,850 issued Sept. 18, 1984, for an "Articulated Vehicle".

Applicant Rotz' arrangement requires and uses only a single, hydraulic, actuating cylinder. It does require, however, the "hands on" manipulation of a swing lock bar and lock pin, as well as the careful alignment of pin holes (to accommodate the lock pin), to put the machine in a left or right crab steering mode. Accordingly, in this arrangement, crab steering cannot be initiated, remotely and hydraulically, from the operator's seat. Rather, the operator must reach down and do the lock bar and lock pin manipulations.

It is an object of this invention to set forth steering means for, and in combination with, an articulated vehicle, which also requires and uses but a single actuator, but which (a) requires none of the aforesaid manual alignment and manipulation and, rather, (b) can be operated remotely from an operator's station.

It is particularly an object of this invention to disclose steering means for an articulated vehicle, in which such vehicle has first and second, spaced-apart, vehicular units coupled together, by a pivotable coupling means, on a pivot axis, comprising a single, dual-ended, linear motor means, fluid-operable for effecting steering displacement of such aforesaid vehicular units relative to each other; means for admitting pressured fluid into said single motor means; means for discharging fluid from said single motor means; means joined to said single motor means for mounting said single motor means, intermediate the ends of the latter, to such aforesaid pivotable coupling means; first means for coupling one of said ends to one of such aforesaid, coupled, vehicular units; and second means for coupling the other of said ends to the other of such aforesaid, coupled, vehicular units; wherein said single motor means includes piston means, responsive to pressured fluid admitted thereinto and discharged therefrom, for translating said ends, relative to said mounting means, for effecting steering of such an aforesaid vehicle in a left-hand direction, for effecting steering of such vehicle in a right-hand direction, for effecting steering of such vehicle in a left crab attitude, and for effecting steering of such vehicle in a right crab attitude, selectively.

It is also an object of this invention to set forth, in combination, an articulated vehicle and steering means therefor, comprising a first vehicular unit having a first rolling axis; second vehicular unit having a second rolling axis; means pivotably coupling said units together for common, rolling travel; and a single actuator means, for steering said articulated vehicle, coupled to (a) said first vehicular unit at a first coupling point along an axial length of said unit subsisting between a midpoint along said first axis and one axial end of said first vehicular unit, (b) said coupling means, and (c) said second vehicular unit at a second coupling point along an axial length of said second unit subsisting between a midpoint along said second axis and one axial end of said second vehicular unit; wherein said actuator means comprises means operative for selectively (d) moving said coupling points into proximity, (e) moving said coupling points apart from each other, (f) moving one of said coupling points in a clockwise direction and the other thereof in a counterclockwise direction, and (g) moving said one coupling point in a counterclockwise direction and said other coupling point in a clockwise direction, whereby said vehicle is disposed in a first crab steering attitude, a second crab steering attitude, a right-turn steering attitude, and a left-turn steering attitude, respectively.

It is yet a further object of this invention to define, in combination, an articulated vehicle and steering means therefor, comprising a first vehicle unit having (a) a first rolling axis, and (b) a first steering axis; a second vehicular unit having (a) a second rolling axis, and (b) a second steering axis; means pivotably coupling said units together for common rolling movement along a travel axis which lies normal to said rolling and steering axes; and a single actuator means, coupled to said coupling means, and to said first and second units in traverse of said travel axis, for disposing said vehicle in left-crab and right-crab attitudes, and for steering said vehicle in left-hand and right-hand turns.

Further objects of this invention, as well as the novel features thereof, will become more apparent by reference to the following description taken in conjunction with the accompanying figures, in which.

Figure 1:
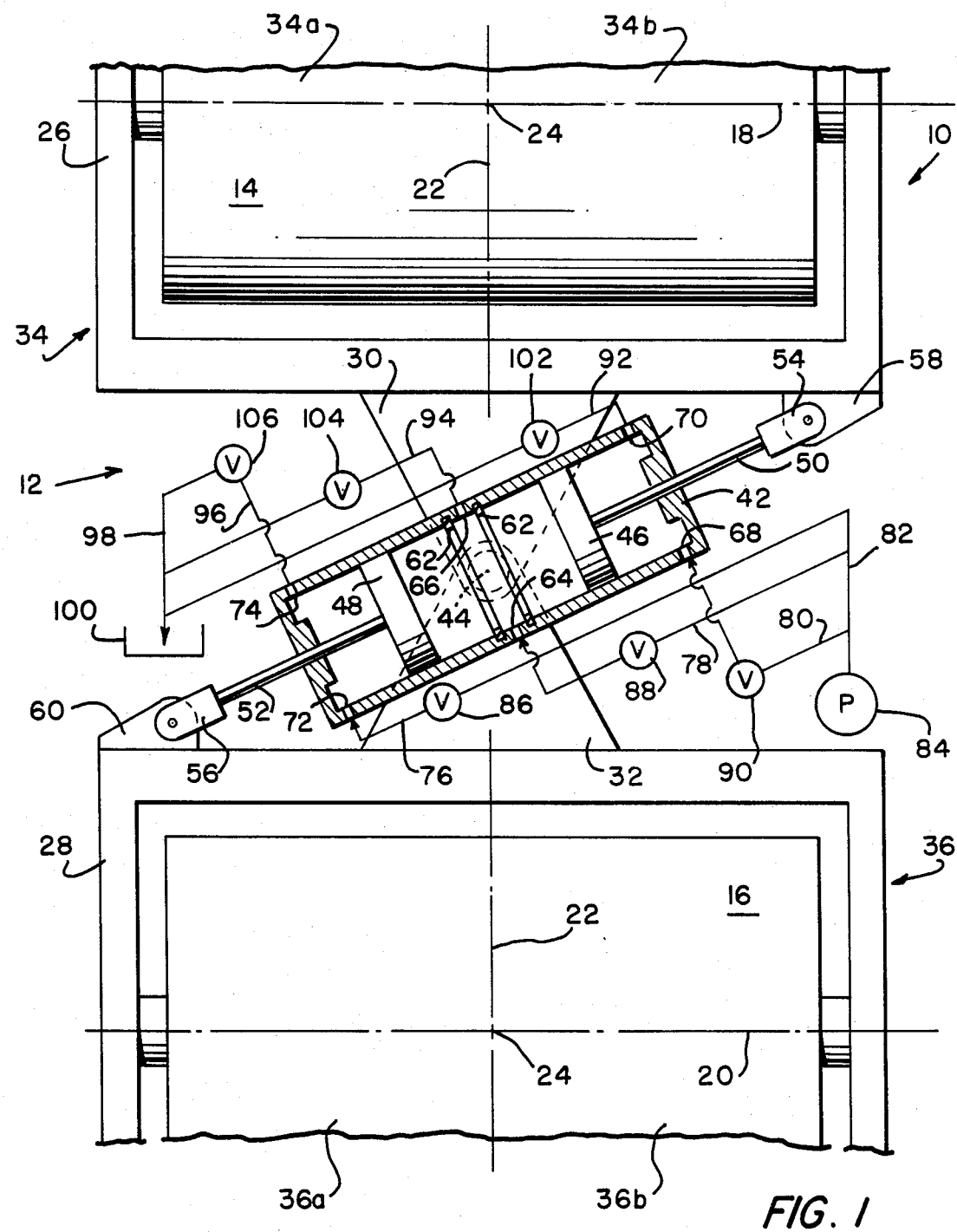
FIG. 1 is a plan view of an articulated, dual-drum, earth compactor, only portions of the drums and drum frames being shown, with the cylinder of an actuator shown in cross-section, and fluid conduitry shown schematically, the same being illustrative of an embodiment of the invention.

As shown in the figures, a dual-drum earth compactor 10, to which the novel steering means 12 has been coupled, has a leading drum 14 and a trailing drum 16. Now, while the invention is disclosed in connection with an earth compactor, it is to be understood that this is done for exemplary purposes only.

Drum 14 has a rolling axis 18, and drum 16 has a rolling axis 20. The drums are pivotably coupled together, for common, rolling movement, along a travel axis 22. Each drum also has a steering axis 24 where the travel axis 22 and the rolling axes 18 and 20 bisect.

Each drum is supported in a frame 26 and 28, respectively, and apertured pintles 30 and 32, integral with the frames, are pivotably pinned together to articulate the compactor 10. For purposes of reference, drum 14 and frame 26 are deemed to be a first, leading, vehicular unit 34 and drum 16 and frame 28 are deemed to be a second, trailing, vehicular unit 36. Further, units 34 and 36 have, to either sides of the steering axes 24, relative to the travel axis 22, left-hand and right-hand portions 34a, 34b, 36a and 36b, respectively.

Steering means 12 is pivotably coupled, at opposite ends thereof to the right-hand portion 34b of unit 34, and to the left-hand portion 36a of unit 36. It lies in traverse of the travel axis 22, and is coupled, intermediate its extent, to the pintles 30 and 32.

Figure 2:
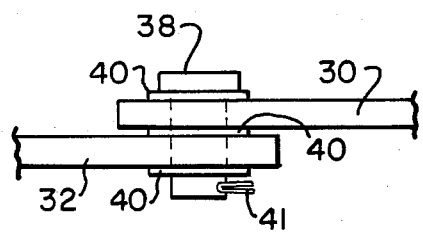
FIG. 2 is a fragmentary, side elevational view of a typical, prior art coupling arrangement for dual drums of an earth compactor.
Figure 3:
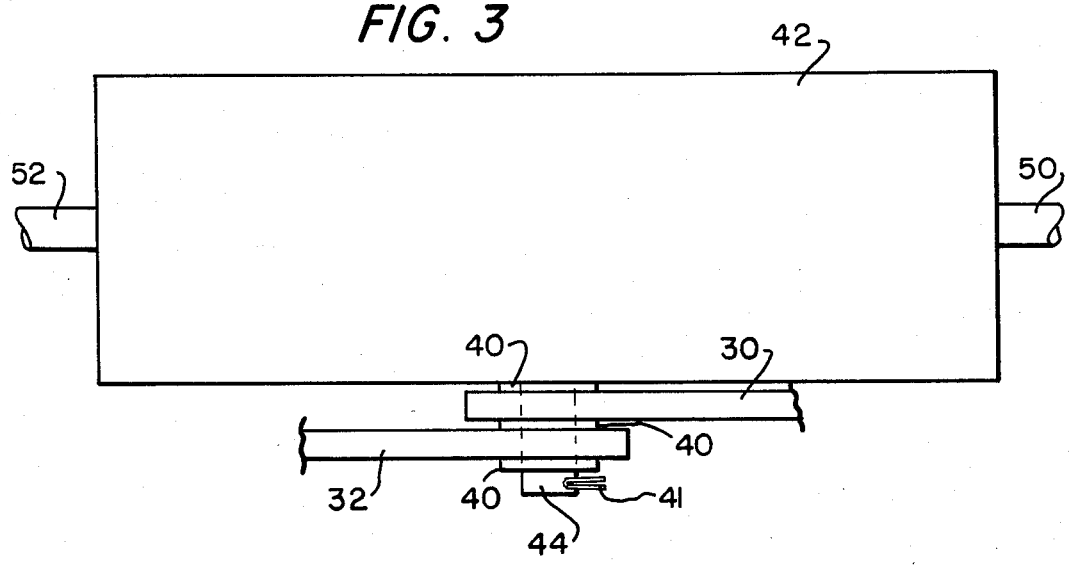
FIG. 3 is a side elevational view of a dual-drum coupling arrangement showing the cylinder of the actuator, of FIG. 1, pivotably fixed to, and serving as a portion of, the coupling.

In prior art arrangements, as shown in FIG. 2, apertured pintles, such as pintles 30 and 32, receive a headed pivot pin 38, and washers 40 therebetween and on outer surfaces thereof, the pin being fixed in place with a cotter pin 41. According to the instant invention, the steering means 12 supplants the pivot pin 38.

Steering means 12 comprises a cylinder 42 which has integral therewith, and extending normal therefrom, a pivot pin 44. The latter is received by the pintles 30 and 32, and is fixed in place by cotter pin 41, to (a) couple the units 34 and 36, and (b) fix the cylinder pivotably in place, therebetween.

Cylinder 42 confines a pair of confronting pistons 46 and 48 translatably therewithin, each piston having a piston rod 50 and 52, respectively, which extends from an end of the cylinder. The end of each rod has a clevis 54 or 56 fixed thereto, and the latter are pivotably pinned to lugs 58 and 60 which are bolted (by hardware not shown) to the frames 26 and 28.

Intermediate the length of the cylinder 42, and therewithin, is a pair of spaced-apart rings 62. The latter are set in annular recesses provided therefor and limit the inward travel of the pistons 46 and 48. Also, intermediate the length of the cylinder, and on opposite sides thereof, are formed a pair of ports 64 and 66. Immediately adjacent the ends of the cylinder, and again on opposite sides thereof, are four more ports 68, 70, 72 and 74. Hydraulic fluid lines 76, 78 and 80 communicate, at one end of each, with ports 72, 64 and 68, respectively. The opposite ends of the aforesaid lines commonly communicate with a hydraulic fluid manifold line 82, and the latter is in communication with a pump 84, the latter providing hydraulic fluid under pressure. Interposed in the lines 76, 78 and 80 are valves 86, 88 and 90, respectively, the latter being operative to permit, and to interdict, fluid-flow through the lines. On the opposite side of the cylinder 42 is a similar arrangement. Lines 92, 94 and 96 open on one end onto ports 70, 66 and 74, respectively, and the opposite ends commonly communicate with a manifold line 98 which, in turn, opens onto a hydraulic fluid reservoir 100. Further, lines 92, 94 and 96 are interrupted with valves 102, 104 and 106, respectively.

Operation of the steering means 12 is as follows. To cause the compactor 10 to execute a right turn, valves 86, 88, 102 and 104 are closed, and valves 90 and 106 are opened. Consequently, pressured hydraulic fluid will enter through port 68, and move the pistons 46 and 48 toward lug 60. Hydraulic fluid will be forced out through port 74 for return to the reservoir 100. The pistons 46 and 48 will not close upon each other; they will retain their illustrated, relative spacing. This is because valves 88 and 104 are closed and, consequently, hydraulic fluid fills the space therebetween. Accordingly, the pistons 46 and 48 will translate in spaced-apart unison. Drum 14 will turn clockwise on its steering axis 24, and rum 16 will turn counterclockwise on its steering axis 24.

To cause the compactor to execute a left turn, valves 90, 88, 104 and 106 are closed, and valves 86 and 102 are opened. Now, pressured hydraulic fluid will enter via port 72 and discharge via port 70. Resultantly, the pistons 46 and 48 will move, in unison, toward lug 58. The travel of rod 50 will turn drum 14 counterclockwise on axis 24, and the travel of rod 52 will turn drum 16 clockwise on its axis 24.

The same, single steering means 12 will, selectively, put the compactor in a left-crab attitude or a right-crab attitude. These are accomplished as follows.

To put the compactor 10 in a left-crab attitude, valves 88, 102 and 106 are closed, and valves 90, 86 and 104 are opened. Hence, hydraulic fluid enters the cylinder 42 via ports 68 and 72, and exits via port 66. As a consequence, pistons 46 and 48 are drawn toward each other, and the lugs 58 and 60 come into closer proximity; drums 14 and 16 turn clockwise on their steering axes 24 and define a left-crab relationship.

The alternative, right-crab attitude is effected as follows. Valves 90, 86 and 104 are closed, and valves 88, 102, and 106 are opened. Now, hydraulic fluid will enter the cylinder via port 64 and exit via ports 74 and 70. The pistons 46 and 48 will be displaced apart, and lugs 58 and 60 will become further removed from each other. Drums 14 and 16 will turn counterclockwise on their steering axes and define a right-crab relationship.

It is a matter of the geometries, of the steering means 12, as to whether crabbing and steering can be accomplished. Simply, if the pistons 46 and 48 are translated but half their travel distance, in a left or right turn maneuver, the remaining travel distance can be used to effect a left or right crabbing. Similarly, if the compactor 10 is put in a left-crab attitude, of left or right disposition, there will still remain half of the pistons's travel to also effect left or right turns, albeit with a wider turning radius.

A compactor-operator's station has not been shown, but it will be appreciated that such can be on a platform above the steering means 12, or above the leading drum 14. Thereat, then, would be located the controls for the valves, a control for the pump 84, and other such controls and gauges as are necessary for compactor operation and monitoring.

While I have described my invention in connection with a specific embodiment thereof it is to be clearly understood that this is done only by way of example and not as a limitation to the scope of my invention as set forth in the objects thereof and in the appended claims.

I claim:

1. Steering means for an articulated vehicle, in which such vehicle has first and second, spaced-apart, vehicular units coupled together, by a pivotable coupling means, on a pivot axis, comprising:

a single, dual-ended, linear motor means, fluid-operable for effecting steering displacement of such aforesaid vehicular units relative to each other;
means for admitting pressured fluid into said single motor means;
means for discharging fluid from said single motor means;
means joined to said single motor means for mounting said single motor means, intermediate the ends of the latter, to such aforesaid pivotable coupling means;
first means for coupling one of said ends to one of such aforesaid, coupled, vehicular units; and
second means for coupling the other of said ends to the other of such aforesaid, coupled, vehicular units; wherein
said single motor means includes piston means, responsive to pressured fluid admitted thereinto and discharged therefrom, for translating said ends, relative to said mounting means, for effecting steering of such an aforesaid vehicle in a left-hand direction, for effecting steering of such vehicle in a right-hand direction, for effecting steering of such vehicle in a left crab attitude, and for effecting steering of such vehicle in a right crab attitude, selectively.

2. Steering means, according to claim 1, wherein:
said motor means comprises an elongate cylinder having end walls;
said piston means comprises a pair of pistons, confined within, said translatable relative to, said cylinder;
said pistons of said pair being in a confronting relationship and each having piston rods which penetrate said end walls and project from opposite ends of said cylinder;
said first coupling means is joined to one of said piston rods;
said second coupling means is joined to the other of said piston rods; and
said fluid admitting and discharging means comprises means for admitting and discharging fluid into and from said cylinder (a) intermediate said pistons of said pair, (b) intermediate one of said end walls and a thereadjacent one of said pistons, and (c) intermediate the other of said end walls and the thereadjacent other piston of said pair.

3. Steering means, according to claim 2, wherein:
said fluid admitting and discharging means further comprises ports formed in said cylinder intermediate the length thereof and at least in near adjacency to opposite ends thereof.

4. Steering means, according to claim 3, further including:
a source of pressured fluid;
a fluid reservoir;
conduits communicating said source with said ports;
conduits communicating said reservoir with said ports; and
valving means interposed in said conduits for opening and closing said conduits to fluid-flow therethrough.

5. Steering means, according to claim 1, wherein:
said mounting means, for said motor means, comprises a pivot pin extending from, and normal to said cylinder.

6. In combination, an articulated vehicle and steering means therefor, comprising:
a first vehicular unit having a first rolling axis;
a second vehicular unit having a second rolling axis;
means pivotably coupling said units together for common, rolling travel; and
a single actuator means, for steering said articulated vehicle, coupled to (a) said first vehicular unit at a first coupling point along an axial length of said unit subsisting between a midpoint along said first axis and one axial end of said first vehicular unit, (b) said coupling means, and (c) said second vehicular unit at a second coupling point along an axial length of said second unit subsisting between a midpoint along said second axis and one axial end of said second vehicular unit; wherein
said actuator means comprises means operative for selectively (d) moving said coupling points into proximity, (e) moving said coupling points apart from each other, (f) moving one of said coupling points in a clockwise direction and the other thereof in a counterclockwise direction, and (g) moving said one coupling point in a counterclockwise direction and said other coupling point in the clockwise direction, whereby said vehicle is disposed in a first crab steering attitude, a second crab steering attitude, a right-turn steering attitude, and a left-turn steering attitude, respectively.

7. The combination, according to claim 6, wherein:
said actuator means comprises a fluid-operable, linear actuator, having a pair of translatable pistons which are disposed in a confronting relationship;
p1 said pistons have outermost piston faces from which piston rods extend on opposite ends of said actuator;
one of said piston rods is pivotably coupled to said first unit at said first coupling point;
the other of said piston rods is pivotably coupled to said second unit at said second coupling point; and
said actuator means further comprises means for admitting pressured fluid and discharging such fluid (a) intermediate said pistons, (b) to and from said outermost face of one of said pistons, and (c) to and from said outermost face of the other of said pistons.

8. The combination, according to claim 7, wherein:
said actuator further comprises a cylinder having a longitudinal axis and end walls;
said pistons are confined within, and translatable relative to, said cylinder; and
said fluid admitting and discharging means comprises means for admitting and discharging fluid into and from said cylinder (a) at at least one given fluid-access point substantially intermediate the length thereof, and (b) at a plurality of other fluid-access points, along the length of said cylinder, spaced apart from said given fluid-access point.

9. The combination, according to claim 8, wherein:
said fluid admitting and discharging means further comprises ports formed in said cylinder at all of said fluid-access points; and further including
a source of pressured fluid;
a fluid reservoir;
conduits communicating said ports with said source and said reservoir; and
valving means interposed in said conduits for opening and closing said conduits to fluid-flow therethrough.

10. In combination, an articulated vehicle and steering means therefor, comprising:

a first vehicular unit having (a) a first rolling axis, and (b) a first steering axis;

a second vehicular unit having (a) a second rolling axis, and (b) a second steering axis;

means pivotably coupling said units together for common, rolling movement along a travel axis which lies normal to said rolling and steering axes; and a single actuator means, coupled to said coupling means, and to said first and second units in traverse of said travel axis, for disposing said vehicle in left-crab and right-crab attitudes, and for steering said vehicle in left-hand and right-hand turns.

11. The combination, according to claim 10, wherein:

said first steering axis is intermediate the length of said first vehicular unit, and defines left-hand and right-hand portions, to each side thereof, of said first vehicular unit;

said second steering axis is intermediate the length of said second vehicular unit, and defines left-hand and right-hand portions, to each side thereof, of said second vehicular unit;

said left-hand portions of said units being in axial alignment, relative to said travel axis;

said right-hand portions of said units being in axial alignment, relative to said travel axis; and said actuator means is coupled to said right-hand portion of one of said units and to said left-hand portion of the other of said units.

* * * * *